United States Patent
Lyon et al.

(10) Patent No.: US 7,719,522 B2
(45) Date of Patent: May 18, 2010

(54) RAW DATA TRACK PAD DEVICE AND SYSTEM

(75) Inventors: Benjamin Lyon, San Jose, CA (US); Stephanie Cinereski, Sunnyvale, CA (US); Chad Bronstein, San Francisco, CA (US); Steven P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1034 days.

(21) Appl. No.: 10/949,060

(22) Filed: Sep. 24, 2004

(65) Prior Publication Data

US 2006/0066582 A1    Mar. 30, 2006

(51) Int. Cl.
G09G 5/00    (2006.01)

(52) U.S. Cl. ............... 345/173; 345/174; 345/178; 178/18.01; 178/18.03

(58) Field of Classification Search ........ 345/156, 345/157, 173–178; 178/18.01–18.09
See application file for complete search history.

(56) References Cited

U.S. PATENT DOCUMENTS

| | | | |
|---|---|---|---|
| 3,541,541 A | 11/1970 | Engelbart | |
| 4,550,221 A | 10/1985 | Mabusth | |
| 5,675,362 A * | 10/1997 | Clough et al. | 345/173 |
| 5,825,351 A * | 10/1998 | Tam | 345/173 |
| 5,825,352 A * | 10/1998 | Bisset et al. | 345/173 |
| 5,940,065 A * | 8/1999 | Babb et al. | 345/178 |
| 6,323,846 B1 | 11/2001 | Westerman et al. | |
| 6,369,837 B1 | 4/2002 | Schirmer | |
| 6,414,671 B1 * | 7/2002 | Gillespie et al. | 345/157 |
| 6,570,557 B1 | 5/2003 | Westerman et al. | |
| 6,677,932 B1 | 1/2004 | Westerman | |
| 7,030,861 B1 | 4/2006 | Westerman et al. | |
| 7,133,031 B2 * | 11/2006 | Wang et al. | 345/173 |
| 7,199,790 B2 * | 4/2007 | Rosenberg et al. | 345/175 |
| 2003/0098858 A1 | 5/2003 | Perski et al. | |
| 2003/0221877 A1 * | 12/2003 | Harrison | 178/18.01 |
| 2006/0066588 A1 | 3/2006 | Lyon et al. | |

FOREIGN PATENT DOCUMENTS

| | | |
|---|---|---|
| CN | 87 1 04380 B | 8/1988 |
| DE | 102 51 296 A1 | 5/2004 |
| WO | 97/18547 A1 | 5/1997 |
| WO | WO 97/18547 | 5/1997 |
| WO | 99/38149 A1 | 7/1999 |
| WO | WO-2006/036607 A1 | 4/2006 |
| WO | WO-2007/037806 A1 | 4/2007 |

OTHER PUBLICATIONS

International Search report dated Mar. 3, 2006 (PCT/US 05/03325).

(Continued)

*Primary Examiner*—Richard Hjerpe
*Assistant Examiner*—Jennifer T Nguyen
(74) *Attorney, Agent, or Firm*—Morrison & Foerster LLP

(57) ABSTRACT

An input device and system are described that acquires (measures) raw track pad sensor data and transmits this data to a host computer where it is analyzed by an application executing on one or more host computer central processing units. The resulting input processing architecture provides a track pad input device that is both lower in cost to manufacture and more flexible than prior art track pad input devices. Lower costs may be realized by eliminating the prior art's dedicated track pad hardware for processing sensor data (e.g., a processor and associated firmware memory). Increased flexibility may be realized by providing feature set functionality via software that executes on the host computer. In this architecture, track pad functionality may be modified, updated and enhanced through software upgrade procedures.

12 Claims, 3 Drawing Sheets

OTHER PUBLICATIONS

Texas Instruments, TSC-2003 I2C Touch Screen Controller, Data Sheet SBAS162, Oct. 2001, 20-pgs.

PCT International Search Report and Written Opinion received in corresponding application No. PCT/US2006/031524 dated Nov. 29, 2006.

Anonymous; "FingerWorks—Gesture Guide—Mouse Emulation;" Internet Article [Online] Dec. 10, 2002; XP002404586; Retrieved at URL: http://web.archive.org/web/20021210155752/http://www.fingerworks.com/gesture_guide_mouse.html.

Anonymous; "FingerWorks—Gesture Guide—Editing;" Internet Article [Online] 13 Feb. 13, 2004; XP002404587; Retrieved at URL:http://web.archive.org/web/20040213220556/www.fingerworkds.com/gesture_guide_editing.html.

Anonymous; "FingerWorks—Gesture Guide—Text Manipulation;" Internet Article [Online] Jun. 6, 2004; XP002404588; Retrieved at URL:http://ww.archive.org/web/20040606073731/www.fingerworks.com/gesture_guide_text_manip.html.

Anonymous; "FingerWorks—Gesture Guide—File Operations;" Internet Article [Online] Jun. 18, 2004; XP002404589; Retrieved at URL:http://web.archive.org/web/20040618040236/www.fingerworks.com/gesture_guide_files.html.

Anonymous; "FingerWorks—Gesture Guide—Application Operations;" Internet Article [Online] Dec. 3, 2002; XP002404590; Retrieved at URL:http://web.archive.org/web/20021203165232/http://www.fingerworks.com/gesture_guide_apps.html.

Anonymous; "FingerWorks—Gesture Guide—Web;" Internet Article [Online] Jun. 5, 2004; XP002404591; Retrieved at URL:http://web.archive.org/web/20040605091621/www.fingerworks.com/gesture_guide_web.html.

Anonymous; FingerWorks—Tips for typing; Internet Article [Online] Jun. 5, 2004; XP002404592; Retrieved at URL: http://web.archive.org/web/20040605171237/www.fingerworks.com/mini-typing.html.

Westerman, et al.; "Multi-Touch: A New Tactile 2-D Gesture Interface for Human-Computer Interaction;" Proceedings of the Human Factors and Ergonomics Society 45th Annual Meeting; Oct. 2001; pp. 632-636; XO008070547.

"iGesture Pad—The Multi-Finger USB TouchPad with Whole-Hand Gestures," obtained from http://www.fingerworks.com/igesture.html on Aug. 27, 2004, generated Aug. 27, 2004, 2-pgs.

"FingerWorks—iGesture—Technical Details,"obtained from http://www.fingerworks.com/igesture_tech.html, generated Aug. 27, 2004, 1-pg.

"FingerWorks—iGesture—User's Guide," obtained from http://www.fingerworks.com/igesture_userguide.html, generated Aug. 27, 2004, 1-pg.

FingerWorks—Guide to Hand Gestures for USB Touchpads, obtained from http://www.fingerworks.com/igesture_userguide.html, generated Aug. 27, 2004, 1-pg.

FingerWorks—Mouse Emulation—Gesture Guide, obtained from http://www.fingerworks.com/gesture_guide_mouse.html, generated Aug. 27, 2004, 1-pg.

FingerWorks—Gesture Guide—Editing, obtained from http://www.fingerworks.com/gesture_guide_editing.html, generated on Aug. 27, 2004, 1-pg.

FingerWorks—Gesture Guide—Text Manipulation, obtained from http://www.fingerworks.com/gesture_guide_text_manip.html, generated on Aug. 27, 2004, 2-pgs.

FingerWorks—Gesture Guide—File Operations, obtained from http://www.fingerworks.com/gesture_guide_files.html, generated on Aug. 27, 2004, 1-pg.

FingerWorks—Gesture Guide—Application Switching, obtained from http://www.fingerworks.com/gesture_guide_apps.html, generated on Aug. 27, 2004, 1-pg.

FingerWorks—Gesture Guide—Web, obtained from http://www.fingerworks.com/gesture_guide_web.html, generated on Aug. 27, 2004, 1-pg.

"FingerWorks—Gesture Guide—Tips and Tricks," obtained from http://www.fingerworks.com/gesture_guide_tips.html, generated Aug. 27, 2004, 1-pg.

"FingerWorks—The Only Touchpads with Ergonomic Full-Hand Resting and Relaxation!," obtained from http://www.fingerworks.com/resting.html, Copyright 2001, 1-pg.

"FingerWorks—Tips for Typing on the Mini," obtained from http://www.fingerworks.com/mini_typing.html, generated on Aug. 27, 2004, 2-pgs.

Chinese Office Action mailed Apr. 4, 2008, for Chinese Patent Application No. 200580032179.8, filed Sep. 15, 2005, 12 pages.

European Office Action mailed Feb. 4, 2008, for EP Application No. 05796332.4, filed Sep. 15, 2005, 7 pages.

Korean Office Action mailed Sep. 9, 2008, for KR Application No. 10-2007-7009191, filed Sep. 15, 2005, 5 pages.

Non-Final Office Action mailed Oct. 28, 2008, for U.S. Appl. No. 11/232,299, filed Sep. 21, 2005, 14 pages.

Final Office Action mailed Apr. 29, 2009, for U.S. Appl. No. 11/232,299, filed Sep. 21, 2005, 15 pages.

\* cited by examiner

RAW DATA TRACK PAD DEVICE AND SYSTEM

BACKGROUND

The invention relates generally to computer input devices and more particularly to a track pad input device that generates and transmits measured (raw) sensor data to a host computer system. Software executing on the host computer system analyzes the raw sensor data to determine the user's action.

A track pad is a touch-sensing planar digitizer input device used instead of, or in conjunction with, a mouse or trackball. During use, an operator places a finger on the track pad and moves the finger along the touch-sensing planar surface. The track pad detects the movement of the finger and in response provides location and/or motion signals to a computer. There are two common types of track pad sensor devices: resistive and capacitive. A resistive track pad sensor is a mechanical sensor that uses two layers of material that are typically separated by air. Pressure from a finger pushes the top layer (generally a thin, clear polyester film) so that it touches the bottom layer (generally glass). The voltage at the contact point is measured and the finger's location and/or motion is computed and transmitted to a host computer system. After the finger is removed, the top layer "bounces back" to its original configuration. A capacitive track or touch pad sensor, in contrast, is a solid-state sensor made using printed circuit board ("PCB") or flex circuit technology. A finger on, or in close proximity to, a top grid of conductive traces changes the capacitive coupling between adjacent traces or the self-capacitance of each trace. This change in capacitance is measured and the finger's location and/or motion is computed and transmitted to a host computer system.

Referring to FIG. 1, prior art computer system 100 includes track pad device 105 coupled to host computer module 110 via communication path 115. Track pad device 105 comprises sensor 120, data acquisition circuit 125, processor 130, memory 135 and transmit circuit 140. In the case of a capacitive track pad device, as a user's finger(s) is (are) moved over the surface of sensor 120, data acquisition circuit 125 measures changes in the capacitive coupling between adjacent sensor elements (or the self-capacitance of a given sensor element). Processor 130, in conjunction with memory 135, processes the acquired capacitance signals to compute a signal indicating the user's finger position on sensor 120 (e.g., a $\Delta x$ and $\Delta y$ signal). In some prior art track pad devices, processor 130 may also determine if multiple fingers are activating sensor 120 and whether certain predetermined finger motions (often referred to as "gestures") are being made—e.g., "select," "drag," "file open" and "file close" operations. At specified intervals (e.g., 50 times per second), the user's finger location and/or motion as determined by processor 130 is transmitted to host computer module 110 via communication path 115. At host computer module 110, receive circuit 145 receives the transmitted track pad signal and passes it's information to driver application 150. Driver application 150, in turn, makes the computed sensor information available to other applications such as, for example, window display subsystem application 155. Thus, prior art system 100 utilizes a dedicated processor for measuring and analyzing raw track pad sensor data to generate a signal that indicates a user's action.

One of ordinary skill in the art will recognize that processor 130 may be embodied in a general purpose processor (e.g., a microprocessor), a microcontroller or a special purpose or custom designed processor or state machine (e.g., an application specific integrated circuit or a custom designed gate array device). Further, memory 135 is typically used to provide permanent storage for instructions (i.e., firmware) to drive processor 130 and may, optionally, include random access memory and/or register storage. A benefit of the architecture of FIG. 1 is that host computer module 110 does not need to know about or understand the type of data generated by sensor 120. A corollary of this feature is that host computer module 110 does not process track pad sensor data.

It will also be recognized by one of ordinary skill that a drawback to the architecture of FIG. 1 is that the feature set (i.e., what motions are detectable) provided by track pad device 105 is essentially fixed by its dedicated hardware—processor 130 and associated firmware (memory 135). Another drawback to the architecture of FIG. 1 is that each manufactured device 105 includes the cost of processor 130 and associated firmware memory 135. Thus, it would be beneficial to provide a track pad device that overcomes these inherent drawbacks.

SUMMARY

In one embodiment the invention provides a track pad input device that includes a track pad sensor element that generates output signals representing a track pad sensor characteristic (i.e., capacitance or resistance), a data acquisition circuit that measures a (digital) value encoding the track pad sensor's characteristic and a communication circuit that transmits the measured track pad sensor values to a general purpose processor for analysis, the general purpose processor is also responsible for executing user and other system level tasks or applications. In one specific embodiment, the track pad sensor is a capacitive track pad sensor so that measured values comprise raw track pad sensor values and the general purpose processor corresponds to a host computer system's central processing unit.

DETAILED DESCRIPTION

Figure 2:
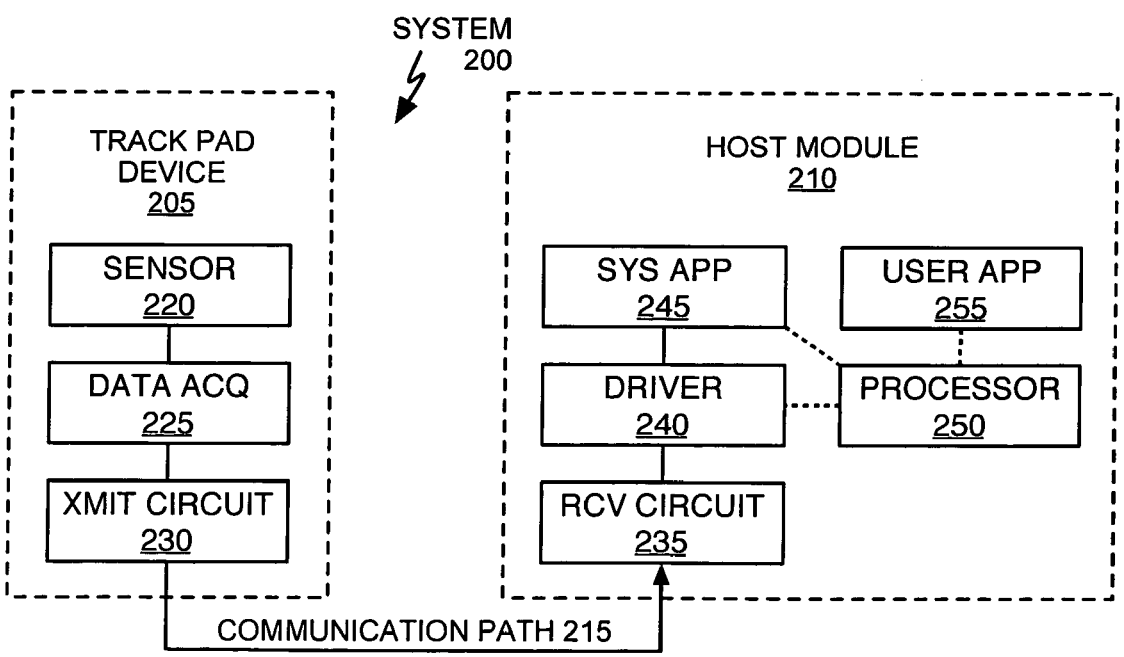
FIG. 2 shows, in block diagram form, a track pad-computer system architecture in accordance with one embodiment of the invention.

Referring first to FIG. 2, the general architecture of a system incorporating a track pad device in accordance with the invention is illustrated. As shown, system 200 includes track pad device 205 coupled to host module 210 through communication path 215. Track pad device 205 comprises track pad sensor 220 that generates signals based on user manipulation thereof, data acquisition circuit 225 for capturing or measuring the sensor's and transmit circuit 230 for aggregating and periodically transmitting the measured sensor data values to host module 210 via communication path 215. At host module 210, receive circuit 235 receives the measured sensor data and passes them to driver application 240. Driver application 240, in turn, processes or analyzes the measured data to determine the user's conduct (e.g., a "single click," "double click," "scroll" or "drag" operation), passing the calculated location and/or movement information to other applications such as, for example, window display subsystem application 245. In accordance with the invention, driver application 240 is executed by host processor 250 which, as shown, is also responsible for executing (at least in part) one or more user applications or processes 255. It is significant to note that track pad device 205 has no capability to process or analyze data signals (values) acquired from sensor 220. In accordance with the invention, sensor data is analyzed by a host computer system's general purpose processor or central processing unit ("CPU").

Figure 1:
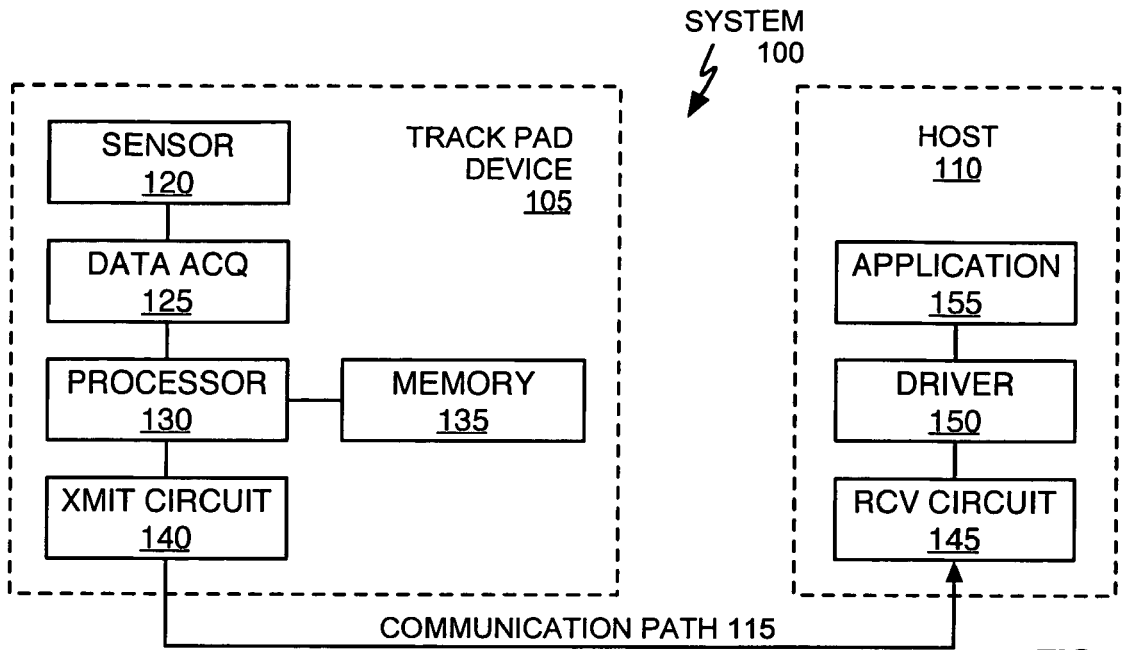
FIG. 1 shows, in block diagram form, a track pad-computer system architecture in accordance with the prior art.

The architecture of FIG. 2 recognizes and takes unique advantage of the processing power of modern CPUs incorporated in host computer systems (e.g., notebook or other personal computers, workstations and servers). This recognition and the architecture of FIG. 2 permits a computer system 200 that is both lower in cost to manufacture and more flexible than the systems provided by the prior art. Lower costs may be realized by eliminating the prior art's dedicated hardware for processing track pad sensor data (i.e., a processor and associated firmware memory—see components 130 and 135 in FIG. 1). Increased flexibility may be realized by providing feature set functionality via software that executes on the host computer's CPU—that is, processing/analyzing measured track pad sensor data on one or more of the host computer's CPUs. In this architecture, track pad functionality may be modified, updated and enhanced through conventional software upgrade procedures.

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Figure 3:
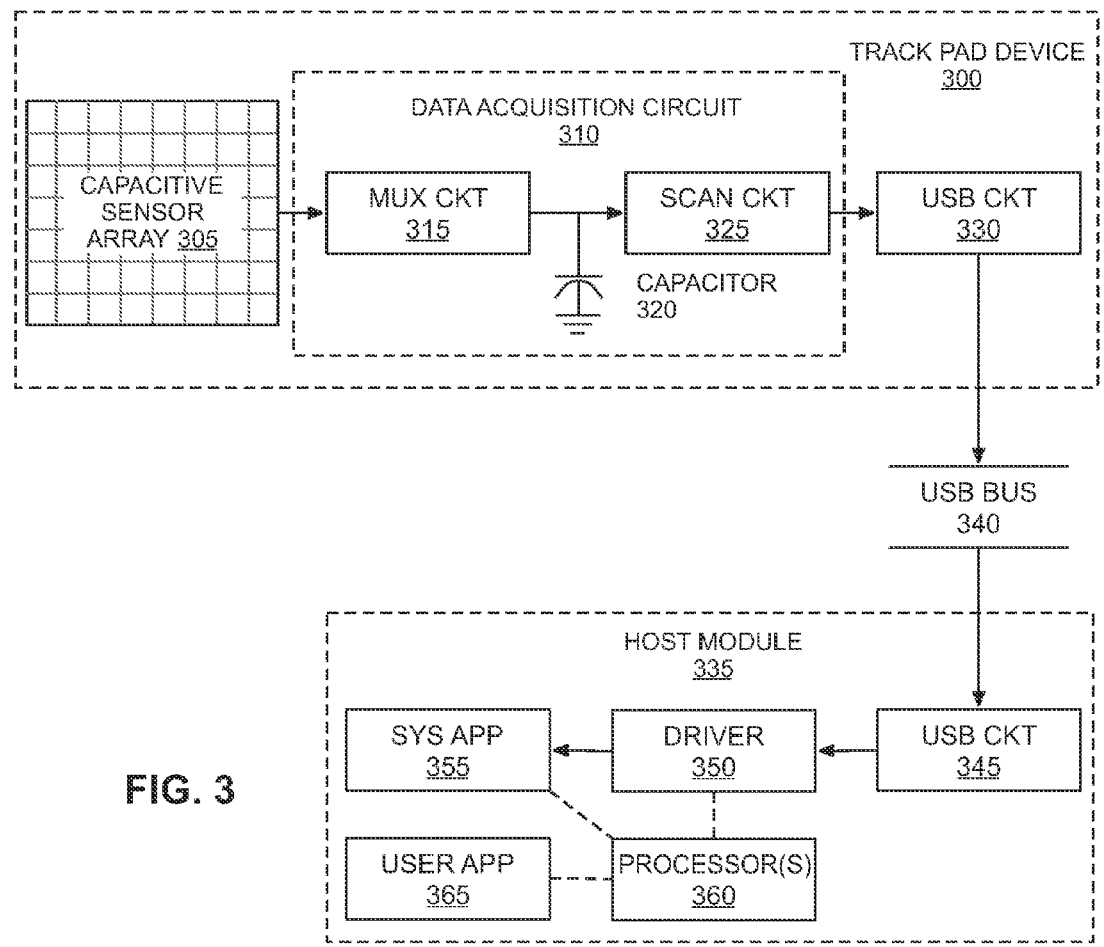
FIG. 3 shows, in block diagram form, a track pad device and host computer system in accordance with one embodiment of the invention.

Referring to FIG. 3, track pad device 300 in accordance with one embodiment of the invention comprises m-row by n-column capacitive sensor array 305, data acquisition circuit 310 (itself comprising multiplexer ("MUX") circuit 315, storage capacitor 320 and scan circuit 325) and Universal Serial Bus ("USB") transmit circuit 330. During operation, MUX circuit 315 is responsible for coupling and stimulating successive sensor array elements (e.g., rows, columns, or individual pixels—that is, an element at the intersection of a row and column) to storage capacitor 320 in a controlled/sequenced manner and indicating that a measurement cycle has begun to scan circuit 325. When the charge on storage capacitor 320 reaches a specified value or threshold, scan circuit 325 records the time required to charge storage capacitor 320 to the specified threshold. Accordingly, scan circuit 325 provides a digital value that is a direct indication of the selected sensor array element's capacitance. USB transmit circuit 330 is responsible for aggregating the measured capacitance values into packets and transmitting them in accordance with the USB protocol to host module 335 via USB bus 340. One of ordinary skill in the art will understand that depending upon the version of USB used and the bandwidth of bus 340, USB transmit circuit 330 may transfer each frame of data to host module 335 in more than one, one or more than one packet. When the host module's USB receive circuit 345 receives the measured sensor data from track pad device 300 via USB bus 340, it unpacks and passes the measured capacitance data to driver application 350. Driver application 350, in turn, accepts and processes the raw (measured) capacitance data to provide meaningful cursor movement input to operating system application 355. (One of ordinary skill in the art will recognize that scan circuit 325 measures capacitance values from sensor array 305 in a predetermined order or sequence and that this sequence must be known by driver application 350 a priori or conveyed to driver application 350 along with the measured sensor data.) In one embodiment, driver application 350 implements track pad algorithms traditionally provided by a dedicated track pad processor such as, for example, processor 130 and firmware memory 135 of FIG. 1.

Figure 4:
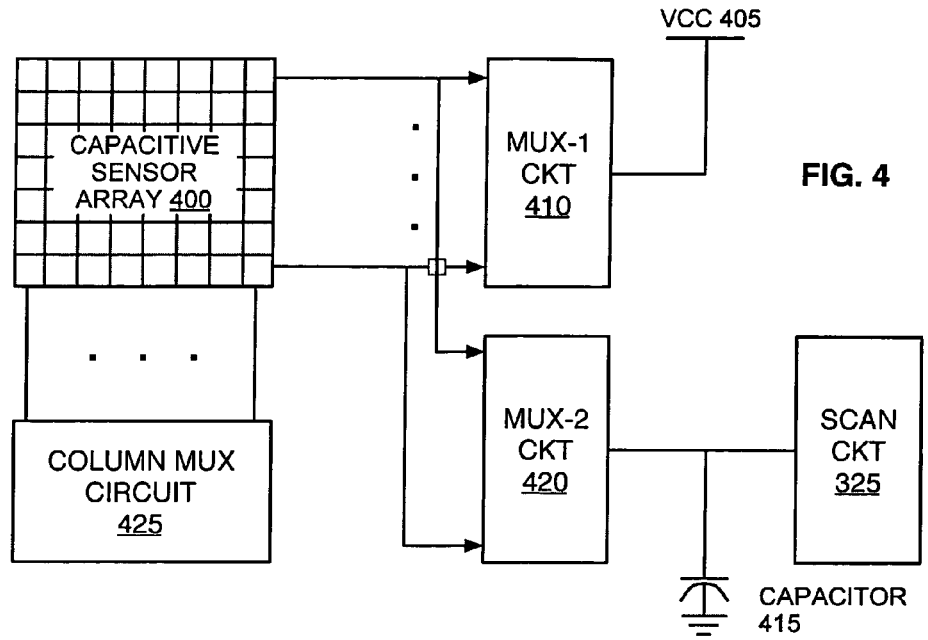
FIG. 4 shows, in block diagram form, a track pad sensor data acquisition system in accordance with one embodiment of the invention.

Referring to FIG. 4, a more detailed view of MUX circuit 315 as it can be implemented for a row and column addressable capacitive sensor array is illustrated. As shown, each row in sensor array 400 is electrically coupled to voltage source Vcc 405 through MUX-1 410 and to storage capacitor 415 through MUX-2 420. (While not shown in detail, each column of sensor array 400 is similarly coupled to Vcc 405 and to storage capacitor 415 through other MUX circuits—block 425.)

Figure 5:
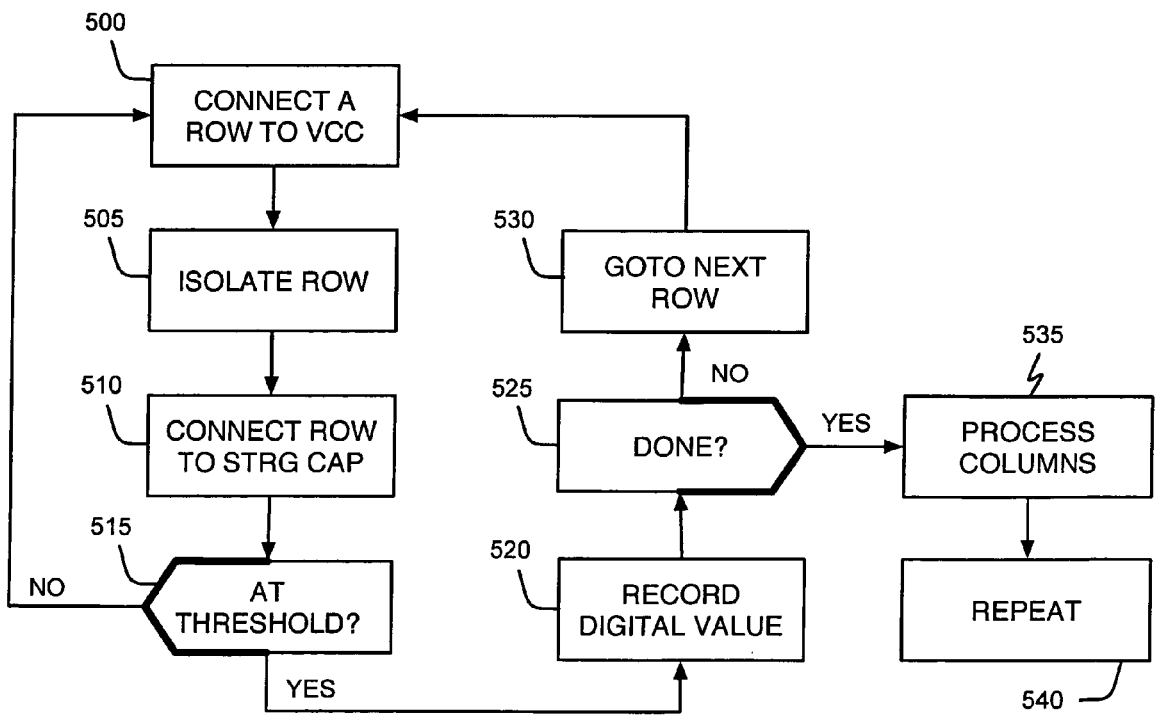
FIG. 5 shows, in flowchart form, a data acquisition method in accordance with one embodiment of the invention.

Referring now to FIG. 5, in operation MUX-1 410 couples a first sensor array row to Vcc 405 for a specified period of time (block 500) and then isolates or disconnects that row from Vcc 405 (block 505). Next, MUX-2 420 couples the same row to storage capacitor 415 for a specified period of time, or until the voltage on storage capacitor 415 reaches a specified threshold (block 510). If, during the time MUX-2 420 couples the selected sensor row to storage capacitor 415 the storage capacitor's voltage reaches a specified threshold (the "Yes" prong of block 515), the digital value corresponding to the time it took to charge storage capacitor 415 to the threshold is recorded by scan circuit 325 (block 520). If, during the time MUX-2 420 couples the selected sensor row to storage capacitor 415 the storage capacitor's voltage does not reach the specified threshold (the "No" prong of block 515), the acts of block 500-510 are repeated. Once a digital value corresponding to the capacitance of the selected row has been obtained (block 520), a check is made to see if there are additional rows in sensor array 400 that need to be sampled. If all the rows in sensor array 400 have been sampled in accordance with blocks 500-520 (the "Yes" prong of block 525), the same process is used to acquire a capacitance value for each column of sensor elements in sensor array 400 (block 535). Once all rows and all columns have been processed in accordance with blocks 500-535, the entire process is repeated (block 540). If, on the other hand, there are rows in sensor array 400 that have not been sampled in accordance with blocks 500-520 (the "No" prong of block 525), the next row is selected (block 530) and the acts of blocks 500-525 are performed.

In one illustrative embodiment: sensor array 400 comprises a 16×32 capacitive grid, providing 48 output channels; Vcc is 3.3 volts; storage capacitor 415 is approximately 10,000 picofarads, an average row capacitance value is approximately 12 picofarads; an average column capacitance value is approximately 9 picofarads; the average change in capacitance of a row or column electrode due to a user's finger touching sensor array 400 is approximately 0.2 picofarads; the threshold value at which a digital capacitance value is obtained is 1.6 volts; and the rate at which MUX circuits 410, 420 and 425 are switched is 6 megahertz. It has been found, for these values, that its takes approximately 580-600 sample cycles to charge storage capacitor 415 to the threshold voltage. In one embodiment, the digital capacitance value is, in fact, a count of the number of sampling cycles required to charge storage capacitor 415 to the threshold value. One of ordinary skill in the art will recognize that this value is directly related to the sensor element's (e.g., row or column) capacitance value. In this embodiment, scan circuit 325 (in conjunction with MUX circuits 410, 420 and 425 and storage capacitor 415) measures each of the 48 sensor array outputs 125 times each second, with each measurement comprising a 10-bit value (unsigned integer). Referring to the 48 measurements acquired by scan circuit 325 from sensor array 400 in each of the 125 epochs as a frame, the illustrative track pad sensor device generates:

$$\left(\frac{48 \text{ channels}}{\text{frame}}\right)\left(\frac{10 \text{ bits}}{\text{channel}}\right)\left(\frac{125 \text{ frames}}{\text{second}}\right)\left(\frac{1 \text{ byte}}{8 \text{ bits}}\right) = 7,500 \text{ bytes/second.}$$

As noted with respect to FIG. 2 and as further shown in FIG. 3, driver application 350 is executed general purpose processing unit 360 that is also responsible for executing user applications and tasks, e.g., 365. That is, in accordance with the invention raw track pad sensor data is analyzed by one, or more, general purpose processing units associated with the host computer system and not by a dedicated processor or processing circuit(s) associated with track pad device 300. A direct consequence of the architecture of FIGS. 2 and 3 is that the processing resources (e.g., CPUS) tasked with analyzing track pad sensor data must be shared with other computer system processing needs such as other system level and user level applications.

Various changes in the materials, components and circuit elements of the described embodiments are possible without departing from the scope of the following claims. Consider, for example, the system of FIG. 3. Other embodiments could include a smaller (e.g., 10×16) or larger (e.g., 32×32) sensor array 305. Further, frame rates other than 125 Hertz ("Hz") and sample resolutions other than 10 bits are possible. It will also be understood that the host computer system may comprise more than one general purpose processing unit (e.g., processor 250). In addition, some of the circuitry identified in FIGS. 2 and 3 as being integral to track pad device 205 or 300 may be embodied in circuitry also used for other functions. For example, transmit circuits 230 and 330 may be shared by other USB input devices such as, for example, a keyboard. In addition, one of ordinary skill in the art will recognize that the invention is also applicable to track pad sensor devices that are pixilated rather that row-column addressable. It will be further recognized that the operational procedure outlined in FIG. 5 may be modified. For instance, sensor column values may be obtained before sensor row values. Alternatively, sensor row and sensor column data may be interlaced and/or measured at the same time. In any event, it will be recognized that scan circuit 325 measures sensor pad characteristic values (e.g., capacitance or resistance) in a set order and that this order must be known or communicated to driver application 350. In yet another embodiment, scan circuit 325 may measure sensor characteristic values in any convenient manner and reorder them into a sequence known or expected by driver application 350 prior to transmission by transmit circuit 330.

What is claimed is:

1. A track pad input device comprising:
   a capacitive track pad sensor having a plurality of sensing elements, each sensing element associated with a region of the capacitive track pad sensor;
   means for measuring and selectively encoding a digital capacitance value for each of the plurality of sensing elements, the digital capacitance value representing a raw capacitance measurement of the sensing element; and
   means for transmitting the plurality of digital capacitance values to a host processor for processing, wherein the digital capacitance values are aggregated into packets and transmitted according to a universal serial bus protocol, and the host processor is also at least partially responsible for executing user-level tasks,
   wherein the track pad sensor comprises a capacitive sensor array, and the means for measuring comprises means for selectively stimulating each of the plurality of sensing elements, means for determining a time required to stimulate each selected sensing element to a specified event, and means for encoding the determined time into a digital value.

2. The track pad input device of claim 1, wherein the track pad input device does not include a means for determining a user action corresponding to manipulation of the track pad sensor.

3. The track pad input device of claim 1, wherein the specified event comprises charging a known capacitance to a specified voltage.

4. The track pad input device of claim 1, wherein a plurality of packets of digital capacitance values is transmitted in a single frame to the host processor under the universal serial bus protocol.

5. The track pad input device of claim 1, wherein the sensing elements comprise at least one of (i) rows of the capacitive sensor array and (ii) columns of the capacitive sensor array.

6. The track pad input device of claim 1, wherein the sensing elements comprise pixels of the capacitive sensor array.

7. A computer system, comprising:
   one or more host processors for executing, at least in part, user-level tasks;
   a display unit operatively coupled to the host processor;
   a first communication circuit operatively coupled to at least one of the one or more host processors; and
   a track pad input device comprising
   a capacitive track pad sensor having a plurality of sensing elements, each sensing element associated with a region of the capacitive track pad sensor;
   a data acquisition circuit electrically coupled to the track pad sensor, the data acquisition circuit selectively encoding a digital capacitance value representing a raw capacitance measurement for each of the plurality of sensing elements; and
   a second communication circuit for transmitting the digital capacitance values to the first communication circuit, wherein the digital capacitance values are aggregated into packets and transmitted according to a universal serial bus protocol, and at least one of the one or more host processors determines, after receiving the packets, an action corresponding to manipulation of the track pad sensor,
   wherein the track pad sensor comprises a capacitive sensor array, and the data acquisition circuit comprises means for selectively stimulating each of the plurality of sensing elements, means for determining a time required to stimulate each selected sensing element to a specified event, and means for encoding the determined time into a digital capacitance value.

8. The computer system of claim 7, wherein a plurality of packets of digital capacitance values is transmitted in a single frame under the universal serial bus protocol.

9. The computer system of claim 7, wherein the specified event comprises charging a known capacitance to a specified voltage.

10. The computer system of claim 7, wherein the data acquisition circuit is adapted to repeatedly encode digital capacitance values for each of the plurality of sensing elements.

11. The track pad input device of claim 7, wherein the sensing elements comprise at least one of (i) rows of the capacitive sensor array and (ii) columns of the capacitive sensor array.

12. The track pad input device of claim 7, wherein the sensing elements comprise pixels of the capacitive sensor array.

* * * * *

UNITED STATES PATENT AND TRADEMARK OFFICE
CERTIFICATE OF CORRECTION

| | | |
|---|---|---|
| PATENT NO. | : 7,719,522 B2 | Page 1 of 1 |
| APPLICATION NO. | : 10/949060 | |
| DATED | : May 18, 2010 | |
| INVENTOR(S) | : Benjamin Lyon et al. | |

It is certified that error appears in the above-identified patent and that said Letters Patent is hereby corrected as shown below:

In column 5, line 17, delete "CPUS)" and insert -- CPUs) --, therefor.

Signed and Sealed this
Eighth Day of November, 2011

David J. Kappos
*Director of the United States Patent and Trademark Office*